(12) United States Patent
Fullerton et al.

(10) Patent No.: US 7,479,332 B2
(45) Date of Patent: Jan. 20, 2009

(54) METHOD AND APPARATUS FOR IMPROVING SIGNAL-TO-NOISE RATIO IN LONGITUDINAL RECORDING MEDIA

(75) Inventors: Eric Edward Fullerton, Morgan Hill, CA (US); David Thomas Margulies, Los Gatos, CA (US); Natacha Supper, Campbell, CA (US); Hoa Van Do, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 509 days.

(21) Appl. No.: 11/073,890

(22) Filed: Mar. 7, 2005

(65) Prior Publication Data
US 2006/0199042 A1 Sep. 7, 2006

(51) Int. Cl.
*G11B 5/66* (2006.01)

(52) U.S. Cl. .................................... 428/828.1; 428/829

(58) Field of Classification Search ........................ None
See application file for complete search history.

(56) References Cited

U.S. PATENT DOCUMENTS

| | | | |
|---|---|---|---|
| 6,551,728 B1 | 4/2003 | Acharya et al. | |
| 6,567,236 B1 | 5/2003 | Doerner et al. | |
| 6,602,612 B2 | 8/2003 | Abarra et al. | |
| 6,623,875 B2 | 9/2003 | Inomata et al. | |
| 6,670,057 B2 * | 12/2003 | Inomata | 428/827 |
| 6,677,051 B1 | 1/2004 | Acharya et al. | |
| 6,759,138 B2 | 7/2004 | Tomiyasu et al. | |
| 2003/0104248 A1 | 6/2003 | Tomiyasu et al. | |
| 2003/0152805 A1 | 8/2003 | Bertero et al. | |
| 2005/0142389 A1 * | 6/2005 | Hinoue et al. | 428/694 TS |

OTHER PUBLICATIONS

Shin-An Chen et al. "Lattice Matching Consideration in Pseudo-AFC Structure" IEEE MAG-39 n.5, p. 2356ff.
J.N. Zhou et al. "Low-noise antiferromagnetically coupled media through the use of a superparamagnetic CoCrRu intermediate layer" Jounal of Applied Physics 93(10) pp. 7765ff.
Chih-Huang Lai et al. "Improvement of Switching Field in AFC Media by Inserting Ru or CoCr Layers in Stabilizing Layer" IEEE MAG-40 n.5, pp. 2434ff.

* cited by examiner

Primary Examiner—Holly Rickman

(57) ABSTRACT

A method and apparatus for improving the signal-to-noise ratio in a longitudinal recording media is disclosed. The apparatus includes a first recording layer of the longitudinal recording media residing at the top of a recording media structure. The first recording layer includes an upper sublayer comprised of a CoPtCrB-based alloy material. The first recording layer also includes a lower sublayer comprised of a CoPtCrB-based alloy material and a middle sublayer comprised of a CoCrB-alloy. The middle sublayer is coupled to the upper sublayer and to the lower sublayer and is substantially thinner than the upper sublayer and the lower sublayer.

7 Claims, 10 Drawing Sheets

METHOD AND APPARATUS FOR IMPROVING SIGNAL-TO-NOISE RATIO IN LONGITUDINAL RECORDING MEDIA

TECHNICAL FIELD

Embodiments of the present invention relate to the field of magnetic thin film media, and more particularly to an apparatus and method for improving signal to noise ratio (SNR) in longitudinal recording media.

BACKGROUND OF THE INVENTION

Prior Art FIG. 1A illustrates a head and disk system 10, according to conventional art. In operation, a magnetic transducer 20 is supported by the suspension 13 as it flies above a disk 16. Magnetic transducer 20, usually called a "head" is composed of elements that perform the task of writing, with write head 23, magnetic transitions and reading, with read head 12, the magnetic transitions. The electrical signals to and from read head 12 and write head 23 travel along conductive paths (leads) 14 which are attached to or embedded in suspension 13. Magnetic transducer 20 is positioned over points at varying radial distances from the center of disk 16 to read and write circular tracks (not shown). Disk 16 is attached to a spindle 18 that is driven by a spindle motor 24 to rotate disk 16. Disk 16 comprises a substrate 26 on which a number of thin films 21 are deposited. Thin films 21 include ferromagnetic material in which the write head 23 records the magnetic transitions in which information is encoded.

Typically, conventional disk 16 includes substrate 26 of glass or AlMg with a coating of $Ni_3P$ that has been highly polished. The thin films 21 on disk 16 typically include an underlayer of chromium or chromium alloy and at least one ferromagnetic layer based on various alloys of cobalt. For example, a commonly used alloy is CoPtCr. Additional elements such as tantalum and boron are often used in the magnetic alloy. A protective overcoat layer is used to improve wearability and corrosion resistance. Various seed layers, multiple underlayers and multi-layered magnetic films exist in the prior art. The multi-layered magnetic films include multiple ferromagnetic layers that are ferromagnetically coupled and more recently antiferromagnetic coupling has been proposed. Seed layers may be used with nonmetallic substrate materials such as glass. Typically the seed layer is a relatively thin layer that is the first crystalline film deposited in the structure and is followed by the underlayer. Materials proposed for use as seed layers include chromium, titanium, tantalum, MgO, tungsten, CrTi, FeAl, NiAl and RuAl.

Prior Art FIG. 1B illustrates layer structure 21 of a thin film magnetic disk 16 according to conventional art. The layers under the underlayer 33 may be any of several combinations of seed layers 32 and pre-seed layers 31 as noted in more detail below. One example includes a pre-seed layer of $CrTi_{50}$, a seed layer of RuAl (B2 crystal structure) and a $CrTi_{10}$ underlayer. The substrate 26 can be any prior art substrate material, either glass or metal. The magnetic layer stack 34 can be composed of a plurality of layers that are further illustrated in Prior Art FIG. 1C.

Prior Art FIG. 1C is an illustration of a conventional magnetic layer stack 34 having at least four distinct layers. The bottom magnetic layer 44 is a ferromagnetic material of the type used in the prior art of thin film disks. Examples of materials suitable for bottom magnetic layer 44 might include CoCr, CoPtCr and CoPtCrB. The coupling/spacer layer 43 is typically a nonmagnetic material with a thickness that is selected to antiferromagnetically couple the top magnetic layer structure 40 with the bottom magnetic layer 44.

The top magnetic layer structure 40, according to the prior art, can be a bilayer structure including two distinct ferromagnetic materials. The interface (first) sublayer 41 is a thin layer of material with a relatively high moment, that is, a moment higher than the second sublayer 42. The preferred materials for the interface sublayer 41 are CoCr, CoCrB and CoPtCrB. The interface sublayer 41 material is selected to have a higher magnetic moment than that the second sublayer 42. Some prior art layer structures, such as layer structure 40, have a third, middle sublayer. In all known examples having a middle sublayer, the middle sublayer includes a Pt component.

Referring to Prior Art FIG. 1D, an illustration of typical grain structure in a section of a magnetic layer (e.g., sublayer 40 of top magnetic layer structure 40) is presented. These grains, such as grain 110, are small columnar grains. The columnar granular structure goes all the way through the layer. When a transition is written, it follows along the rows of grains. To a first order, the number of grains that exist in a bit affects the signal-to-noise ratio (SNR). In an ideal situation in which all grains (for example, grain 110) are identical in shape, size, and properties, the SNR is proportional to the square root of the number of grains in a bit. However, in reality, the grains vary in properties, such as size, as is illustrated by the difference between diameter 140 and diameter 150. With different size grains, the distances from one to another can vary, as illustrated by distance 120 and distance 130. Other properties of the grains such as their magnetic moment and internal anisotropy can also vary which will lower the media's SNR.

Historically, to improve SNR, the grains of the media have been made smaller. As the grains become smaller and smaller, their energy becomes comparable to thermal energy and the material begins to lose stability (super-paramagnetic limit). This situation is being realized and, thus, the historic pathway to improving SNR in thin film media is coming to an end.

SUMMARY

A method and apparatus for improving the signal-to-noise ratio in a longitudinal recording media is disclosed. The apparatus includes a first recording layer of the longitudinal recording media residing at the top of a recording media structure. The first recording layer includes an upper sublayer comprised of a CoPtCrB-based alloy material. The first recording layer also includes a lower sublayer comprised of a CoPtCrB-based alloy material and a middle sublayer comprised of a CoCrB-alloy. The middle sublayer is coupled to the upper sublayer and to the lower sublayer and is substantially thinner than the upper sublayer and the lower sublayer.

BRIEF DESCRIPTION OF THE DRAWINGS

Prior Art

Prior Art

Prior Art

Prior Art

DETAILED DESCRIPTION

Reference will now be made in detail to embodiments of the invention, examples of which are illustrated in the accompanying drawings. While the invention will be described in conjunction with the embodiments, it will be understood that they are not intended to limit the invention to these embodiments. Furthermore, in the following detailed description, numerous specific details are set forth in order to provide a thorough understanding of the present invention. In other instances, well known methods, procedures, and components have not been described in detail so as not to unnecessarily obscure aspects of the present invention.

Embodiments of the present invention include an apparatus and method for improving signal-to-noise ratio in longitudinal recording media. Embodiments of the present invention provide a method and apparatus for improving the signal-to-noise ratio in a longitudinal recording media. The apparatus includes a first recording layer of the longitudinal recording media residing at the top of a recording media structure. The first recording layer includes an upper sublayer comprised of a CoPtCrB-based alloy material. The first recording layer also includes a lower sublayer comprised of a CoPtCrB-based alloy material and a middle sublayer comprised of a CoCrB-alloy. Hence, unlike the prior art, the middle sublayer does not require a Pt component. The middle sublayer is coupled to the upper sublayer and to the lower sublayer and is substantially thinner than the upper sublayer and the lower sublayer. The result of providing a middle sublayer in the first recording layer is that of improved SNR. It is believed that the middle sublayer promotes the growth of grains that are more uniform in properties than those in a recording layer that does not have a CoCrB interlayer. Thus, the improvement in grain uniformity can result in improved SNR in the absence of a reduced average grain size.

Figure 5:
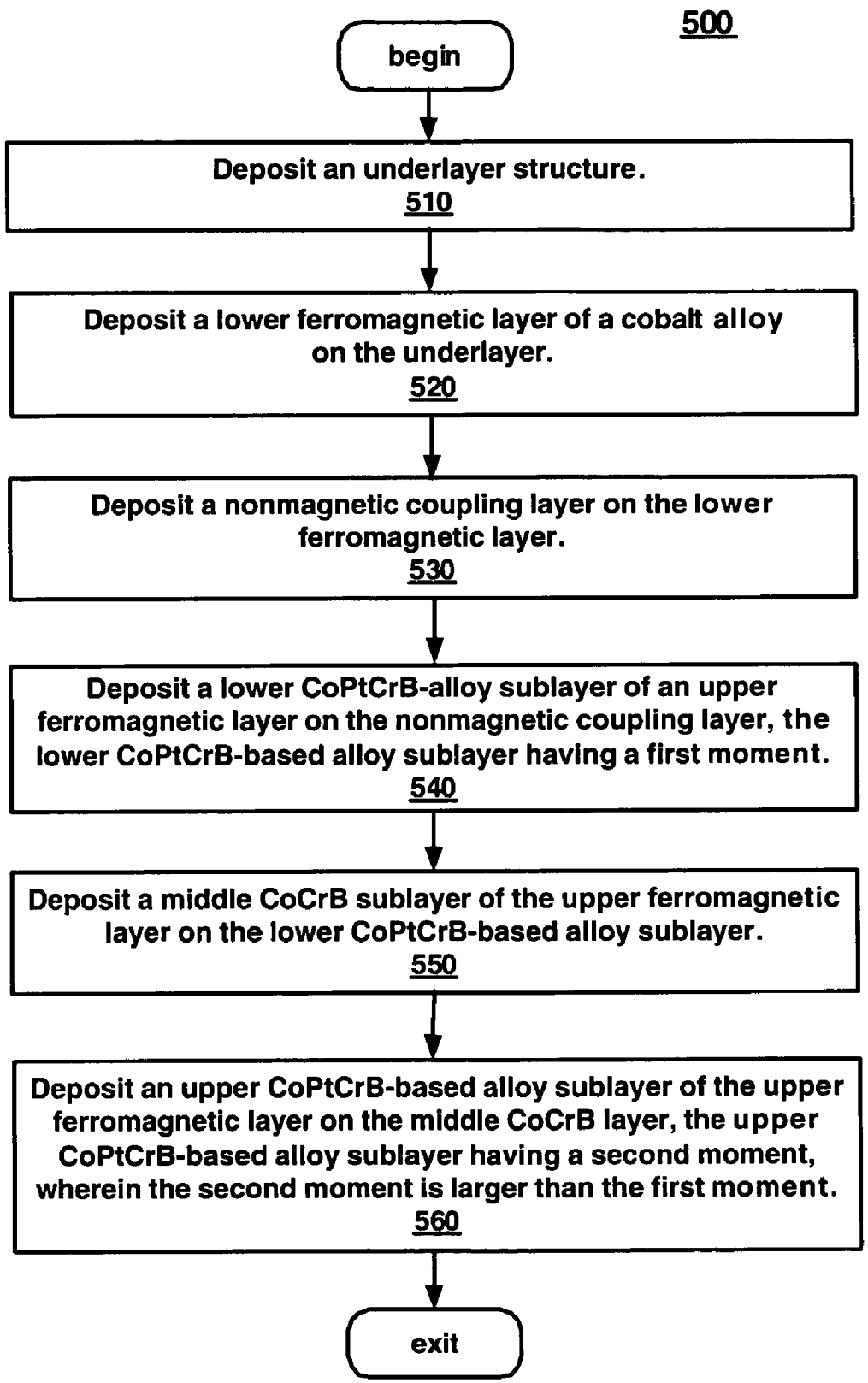
FIG. 5 is a flow diagram of a method for reducing signal to noise ratio in longitudinal recording media, in accordance with an embodiment of the present invention.

Certain portions of the detailed descriptions of embodiments of the invention, which follow, are presented in terms of processes and methods (e.g., method 500 of FIG. 5). Although specific steps are disclosed herein describing the operations of these processes and methods, such steps are exemplary. That is, embodiments of the present invention are well suited to performing various other steps or variations of the steps recited in the processes and methods herein.

Figure 1A:
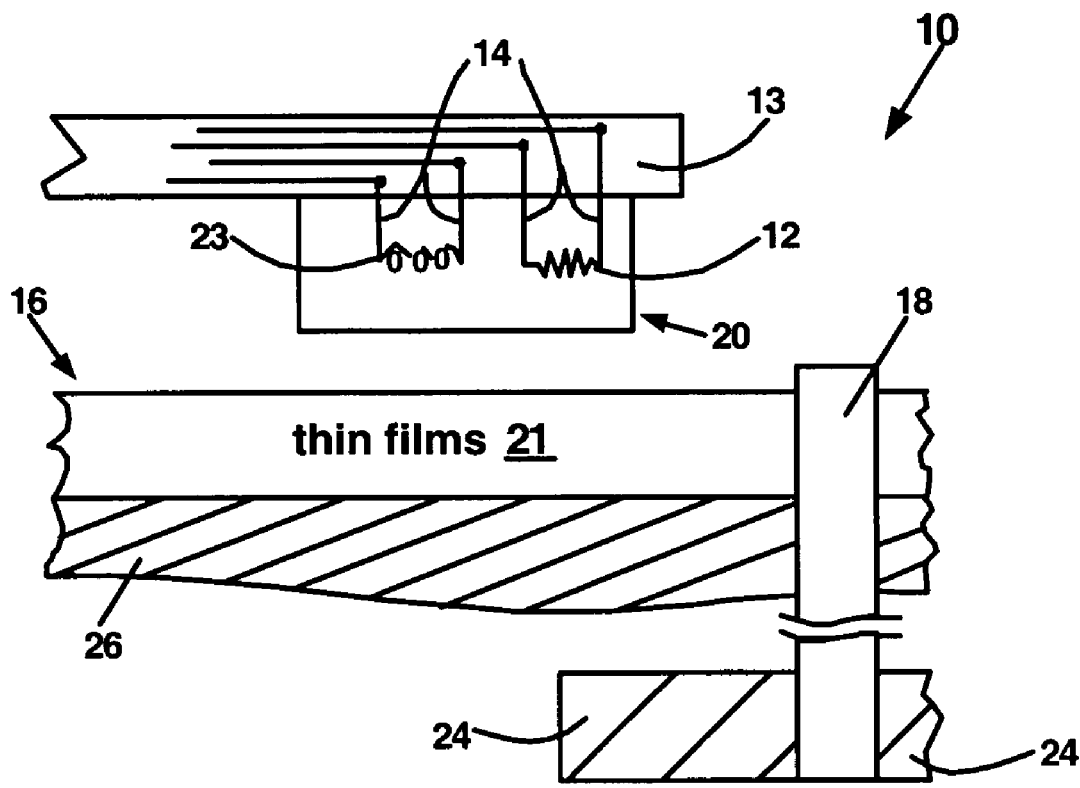
FIG. 1A is a symbolic illustration of the relationships between a head and associated components in a hard disk drive.
Figure 1B:
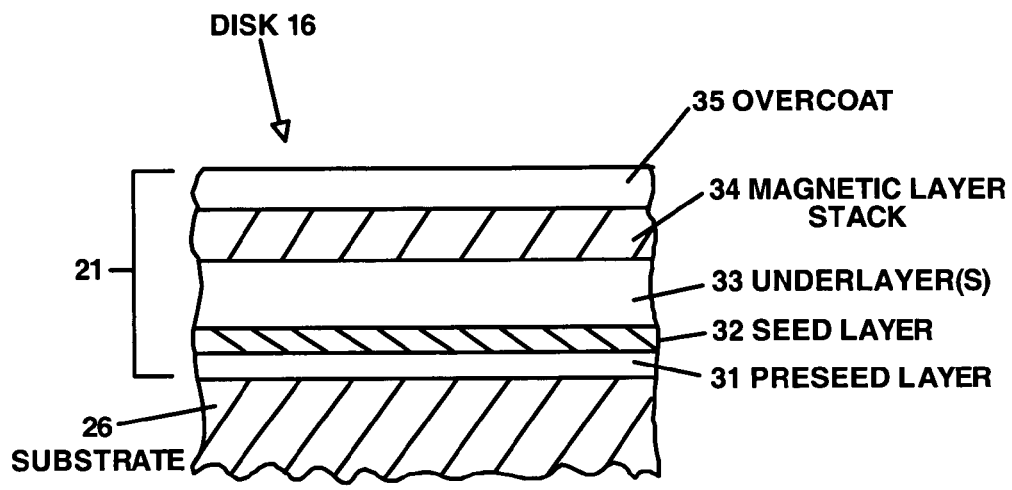
FIG. 1B is an illustration of a typical layer structure for a magnetic thin film disk.
Figure 1C:
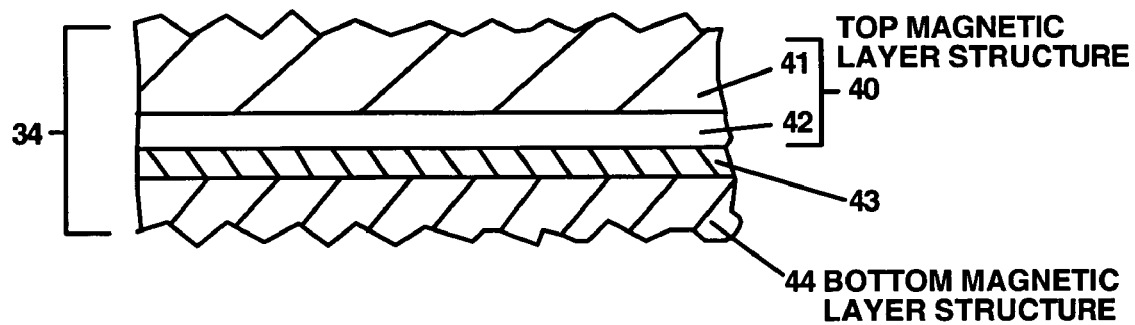
FIG. 1C is an illustration of a typical layer stack including a bilayer upper ferromagnetic layer structure for a magnetic thin film disk.
Figure 1D:
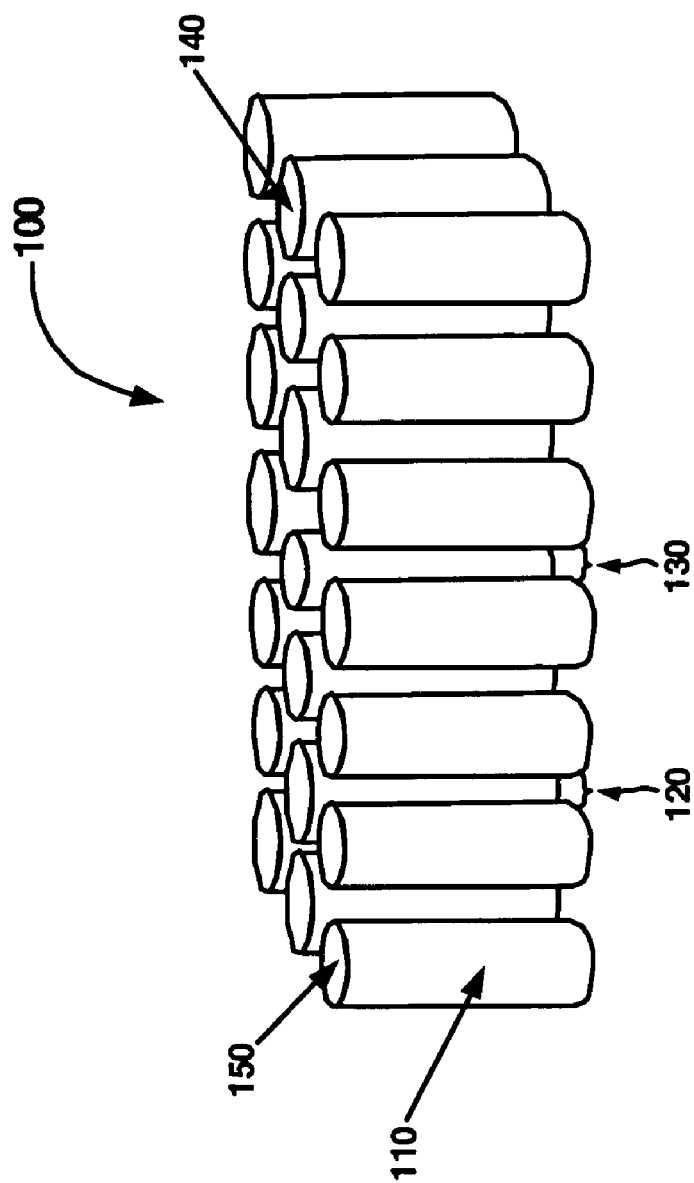
FIG. 1D is an illustration typical grain structure in a section of a magnetic layer.
Figure 2:
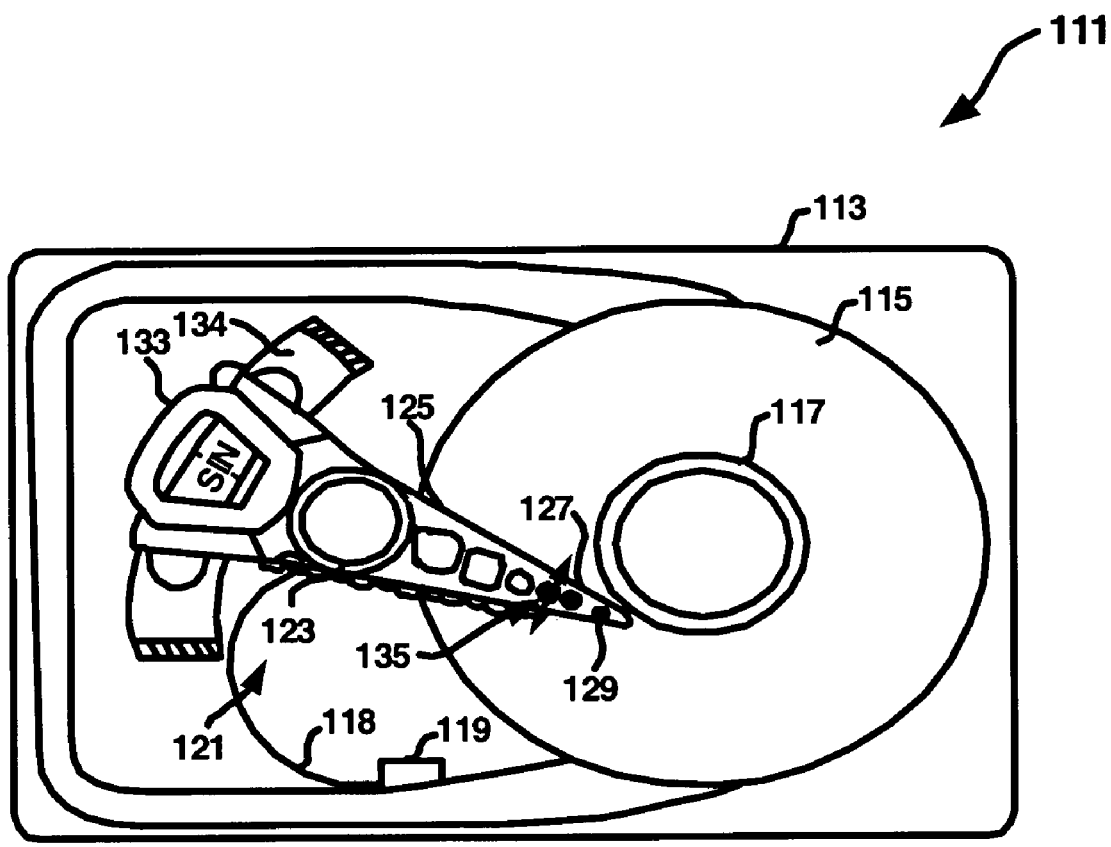
FIG. 2 is a schematic drawing of one embodiment of a magnetic hard disk drive or file for storing data, in accordance with the present invention.

FIG. 2 is a schematic drawing of one embodiment of a magnetic hard disk drive or file 111 for storing data, in accordance with the present invention. File 111 has an outer housing or base 113 containing a disk pack having at least one media or magnetic disk 115. The disk or disks 115 are rotated by a spindle motor assembly having a central drive hub 117. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115. Control signals are transmitted from controller 119 to actuator 121 through flex cable 118.

In the embodiment shown, each arm 125 has extending from it at least one cantilevered load beam and integrated lead suspension (ILS) 127. A magnetic read/write transducer or head is mounted on a slider 129 and secured to a flexure that is flexibly mounted to each ILS 127. The read/write heads magnetically read data from and/or magnetically write data to disk 115, also referred to herein as longitudinal recording media. Disk 115 comprises structural layers of materials. The upper recording layer of disk 115 may, according to one embodiment of the present invention, comprise three sublayers. The top and bottom sublayers may be comprised of a cobalt-chromium-platinum-boron alloy and the middle sublayer may be comprised of a cobalt-chromium-boron alloy. The middle sublayer is substantially thinner than the upper and lower sublayers. The level of integration, called the head gimbal assembly, is the head and the slider 129, which are mounted on suspension 127. The slider 129 is usually bonded to the end of ILS 127.

ILS 127 has a spring-like quality, which biases or presses the air-bearing surface of the slider 129 against the disk 115 to cause the slider 129 to fly at a precise distance from the disk. ILS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and always move in unison with one another, unless file 111 uses multiple independent actuators (not shown) wherein the arms can move independently of one another.

Figure 3:
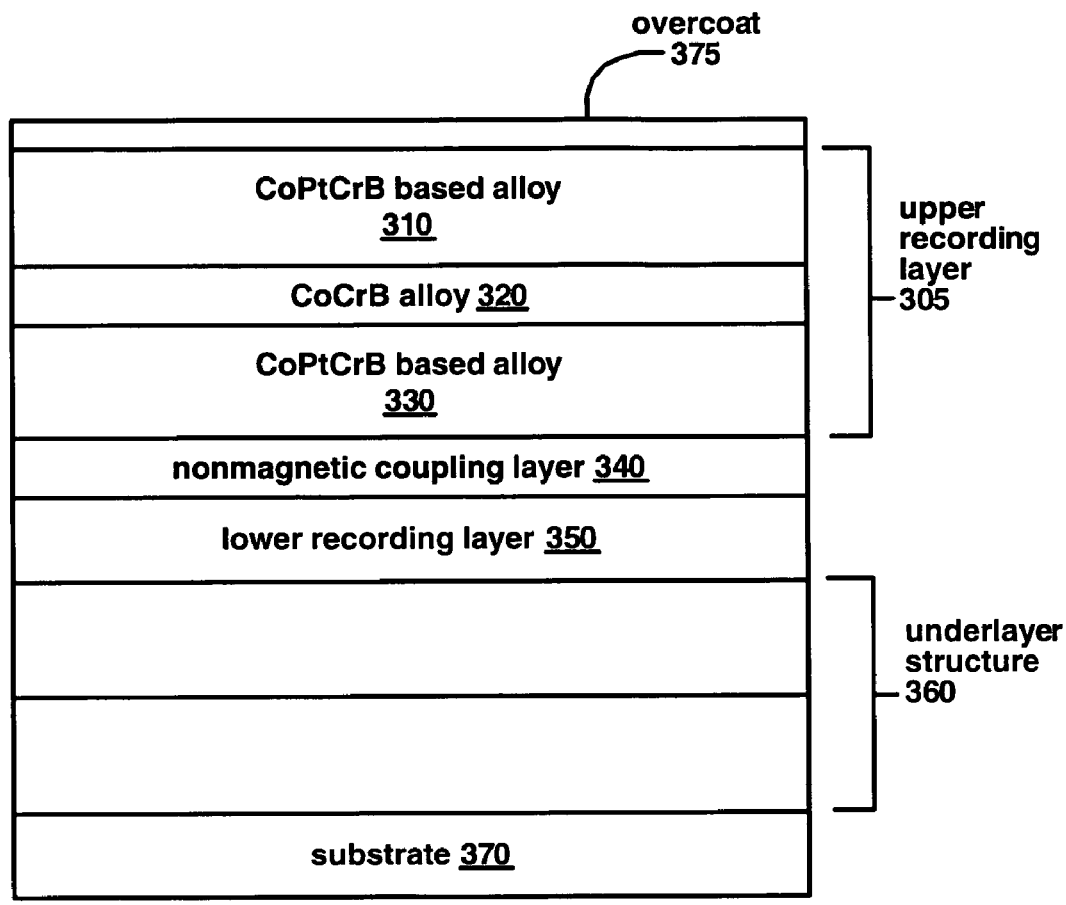
FIG. 3 is an illustration of an antiferromagnetically coupled recording media structure with the upper recording layer having three sublayers, in accordance with an embodiment of the present invention.

FIG. 3 is an illustration an antiferromagnetically coupled (AFC) recording media structure 300 with the upper recording layer 305 consisting of three sublayers, in accordance with an embodiment of the present invention. Although the present embodiment illustrates an antiferromagnetically coupled structure, it is understood that embodiments of the invention may also be well suited for a standard (non-AFC) recording media.

According to one embodiment, AFC media structure 300 begins with a sputter deposition of an underlayer structure 360 on a substrate 370 that functions as a seed layer to start the growth process. In one embodiment substrate 370 can be metal such as NiP-coated AlMg, and in another embodiment substrate 370 can be glass. In the embodiment in which substrate 370 comprises a metal material, underlayer structure 360 may, comprise dual layers, e.g., a lower layer of chromium and an upper layer of CrMoB. In another embodiment it may comprise a single layer, or multiple layers. In the embodiment in which substrate 370 comprises glass, underlayer structure 360 would be comprised of different materials than those used on a metal substrate 370.

Still referring to FIG. 3, lower recording layer 350 is then deposited on underlayer structure 360, according to one embodiment of the present invention. Lower recording layer 350 is the first magnetic layer that makes up the lower recording layer of the AFC structure. In one embodiment, lower recording layer 350 may be comprised of, but not limited to, a CoCrTa alloy.

Lower recording layer 350 is antiferromagnetically exchange coupled to upper recording layer 305 by nonmagnetic coupling layer 340, according to one embodiment of the present invention. The coupling layer 340 is typically a nonmagnetic material with a thickness that is selected to antiferromagnetically couple the upper magnetic recording layer 305 with the lower magnetic recording layer 350. In one embodiment, nonmagnetic coupling layer 340 may be ruthenium or a ruthenium alloy. In another embodiment, nonmagnetic coupling layer 340 may be rhodium. In other embodiments, coupling layer 340 may be of materials such as chromium, iridium, or copper and their alloys.

Upper recording layer 305 has a magnetization direction that is opposite to the magnetization direction of lower recording layer 350, and comprises three sublayers, according to embodiments of the present invention.

Lower sublayer 330 may be comprised of a CoPtCrB-based alloy material, e.g., $Co_{58}Pt_{13}Cr_{22}B_5Ta_2$, according to one embodiment of the present invention. Upper sublayer 310 is comprised of a CoPtCrB-based alloy material, e.g., $Co_{60}Pt_{13}Cr_{12}Bl_{15}$. Upper sublayer 310 has a higher magnetic moment than the magnetic moment of lower sublayer 330. Upper sublayer 310 may have a protective overcoat to protect it from oxidation and mechanical wear. Such an overcoat may be comprised of a carbon or silicon nitride material.

Middle sublayer 320 is comprised of a CoCrB alloy, e.g., $Co_{78}Cr_{22}B_{10}$, ranging in thickness from 0.7 to 3 nm, according to embodiments of the present invention. Hence, unlike prior art, middle sublayer 320 does not require a Pt component. Middle sublayer 320 is coupled to upper sublayer 310 and to lower sublayer 330 and is substantially thinner than upper sublayer 310 and the lower sublayer 330. The result of providing a middle sublayer in the first recording layer is that of improved SNR. Middle sublayer 320 can be as thin as 0.7 nm and still provide improved SNR.

Figure 4:
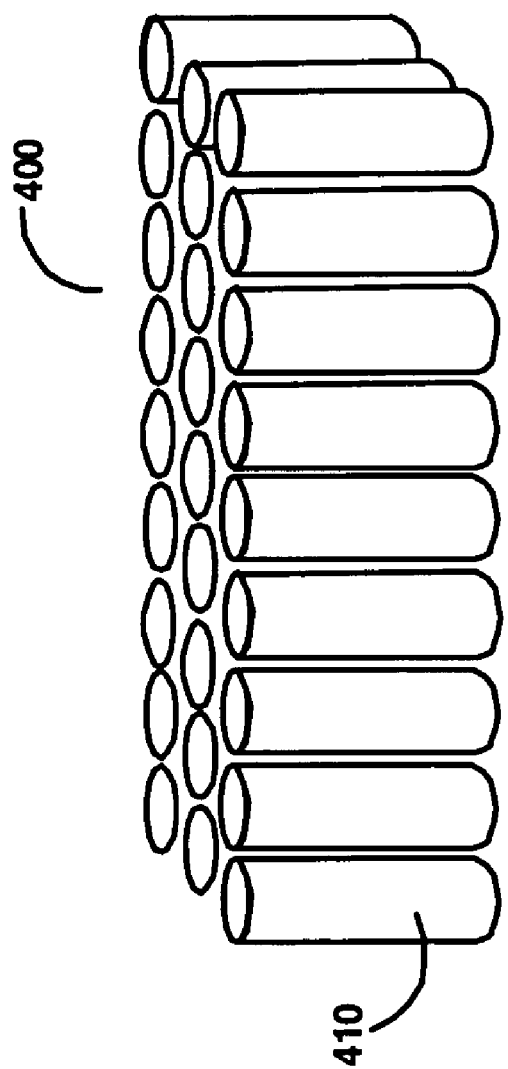
FIG. 4 is an illustration of grains in a section of magnetic recording media layer, in accordance with an embodiment of the present invention.
Figure 6:
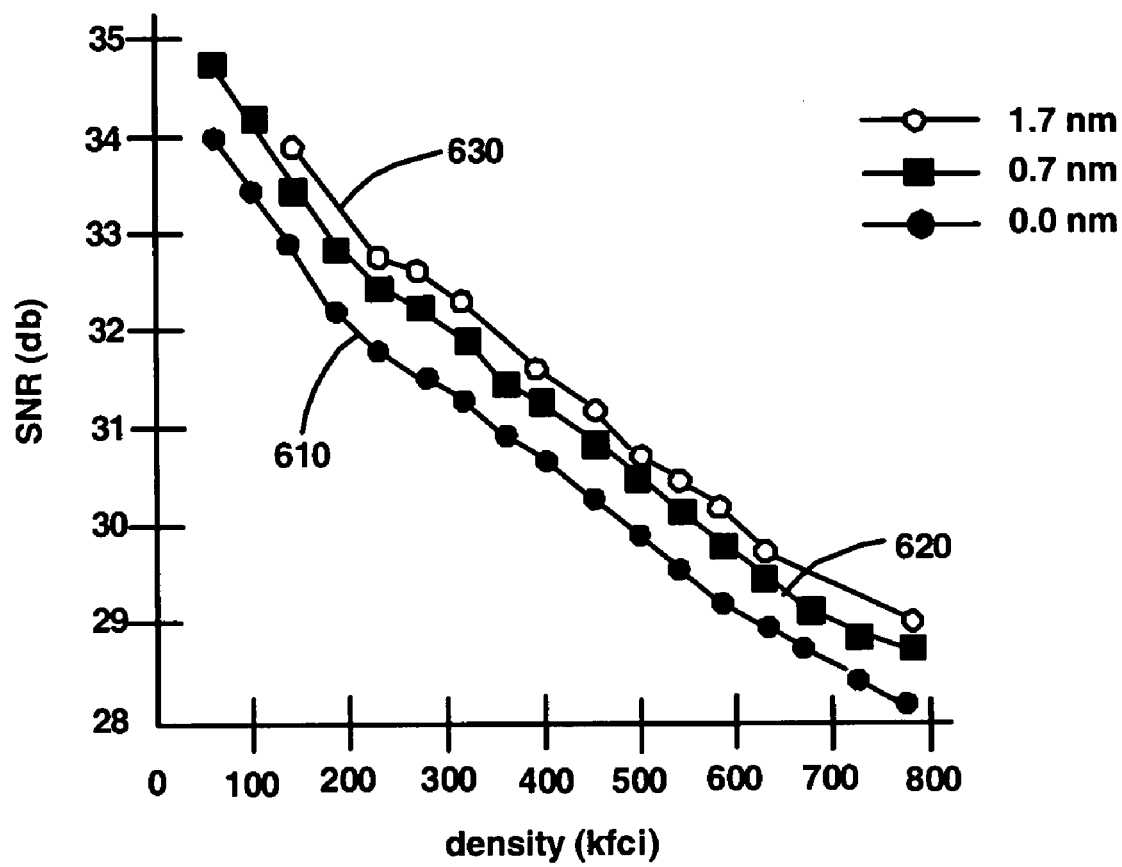
FIG. 6 is a graph illustrating improvement in signal to noise ratio with the addition of a CoCrB sublayer in the middle of an upper recording layer, in accordance with an embodiment of the present invention.
Figure 7:
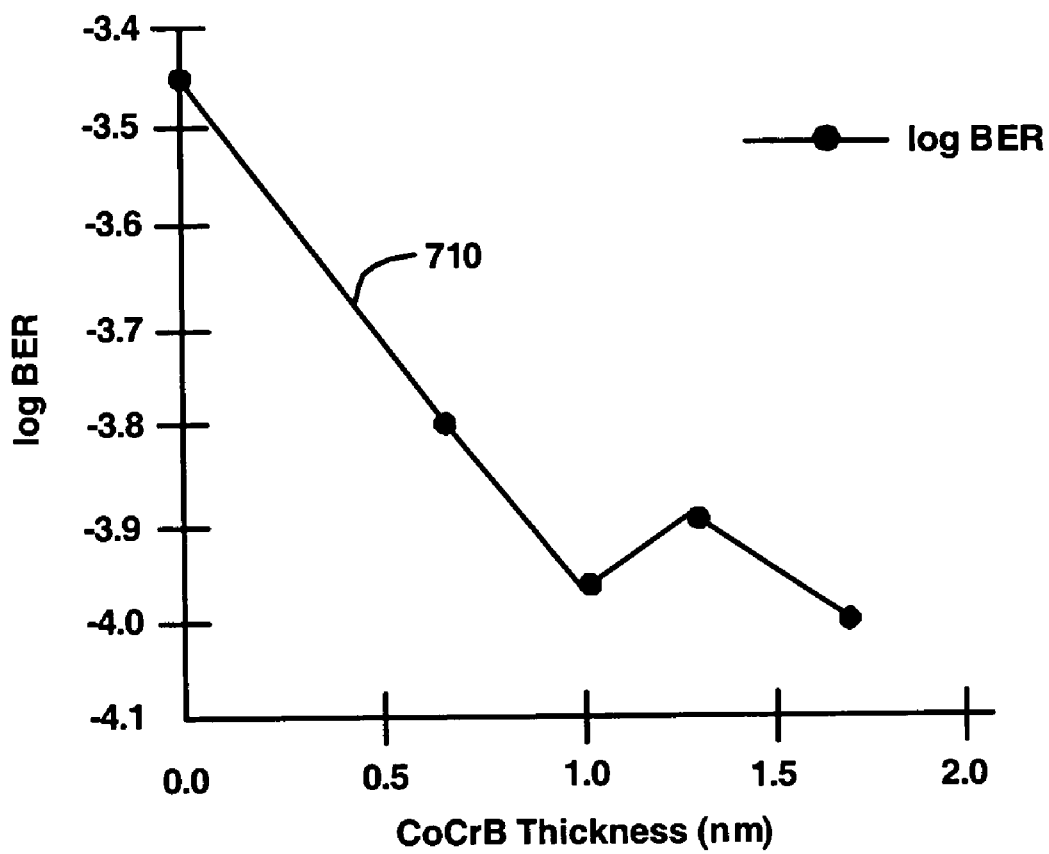
FIG. 7 is a graph illustrating improvement in bit error rate with the addition of a CoCrB sublayer in the middle of an upper recording layer, in accordance with an embodiment of the present invention.

It is believed that the middle sublayer promotes the growth of grains that have magnetic properties that are more uniform than those in a recording layer that does not have a CoCrB interlayer. FIG. 4, is an illustration of grains in a magnetic recording media layer, in accordance with an embodiment of the present invention. Grains 410 of FIG. 4 are shown to be uniform in properties, such as shape and size. The improvement in grain uniformity can, for one thing, result in the grains in a bit fitting more tightly together and, thus, the number of grains in a bit being increased without reducing the grain size. However, more importantly, if the magnetic properties of the grains become more uniform, the SNR can improve even in the absence of reduced grain size. The magnetic uniformity of the grains is improved according to embodiments of the present invention, the SNR is thus improved. Refer to FIGS. 6 and 7 for results of measurements showing the improvement in SNR resulting from the addition of middle sublayer 320.

FIG. 5 is a flow diagram of a method 500 for reducing signal to noise ratio in longitudinal recording media, in accordance with an embodiment of the present invention. At step 510 an underlayer structure (e.g., underlayer structure 360 of FIG. 3) is deposited by a sputter deposition process on a substrate. The underlayer structure functions as a seed layer to start the growth process. In one embodiment the substrate can be metal such as NiP-coated AlMg, and in another embodiment the substrate can be glass. In the embodiment in which the substrate comprises a metal material, the underlayer structure may comprise dual layers, e.g., a lower layer of chromium and an upper layer of CrMoB. In another embodiment it may comprise a single layer, or multiple layers. In the embodiment in which the substrate comprises glass, the underlayer structure would be comprised of different materials than those used on a metal substrate.

At step 520 of method 500, according to one embodiment, a lower ferromagnetic layer (e.g., lower recording layer 350 of FIG. 3) of a cobalt alloy is deposited on the underlayer. The lower ferromagnetic layer is the first magnetic layer that makes up the lower recording layer of the AFC structure. In one embodiment, the lower ferromagnetic layer may be comprised of, but not limited to, a CoCrTa alloy.

At step 530, a nonmagnetic coupling layer (e.g., nonmagnetic coupling layer 340 of FIG. 3) is deposited on the lower ferromagnetic layer, in accordance with an embodiment of the present invention. The lower ferromagnetic layer is antiferromagnetically exchange coupled to an upper ferromagnetic layer by the nonmagnetic coupling layer. The coupling layer is typically a nonmagnetic material with a thickness that is selected to antiferromagnetically couple the upper ferromagnetic recording layer with the lower ferromagnetic recording layer. In one embodiment, the nonmagnetic coupling layer may be ruthenium or a ruthenium alloy. In another embodiment, the nonmagnetic coupling layer may be rhodium. In other embodiments, the coupling layer may be of materials such as chromium, iridium, or copper and their alloys.

At step 540, a lower CoPtCrB-alloy sublayer of an upper ferromagnetic layer is deposited on the nonmagnetic coupling layer, wherein the lower CoPtCrB-alloy sublayer has a first moment, according to one embodiment of the present invention. The upper ferromagnetic layer has a magnetization direction that is opposite to that of the lower ferromagnetic layer, and comprises three sublayers. The lower CoPtCrB-alloy sublayer may be comprised of $Co_{58}Pt_{13}Cr_{22}B_5Ta_2$.

At step 550 of FIG. 5, a middle CoCrB sublayer (e.g., middle sublayer 320 of FIG. 3) of the upper ferromagnetic layer is deposited on the lower CoPtCrB sublayer. The middle sublayer is comprised of a CoCrB alloy, e.g., $Co_{78}Cr_{22}B_{10}$, ranging in thickness from 0.7 to 3 nm, according to embodiments of the present invention. The middle sublayer is coupled to an upper sublayer and to the lower sublayer and is substantially thinner than the upper sublayer and the lower sublayer. The result of providing a middle sublayer in the upper ferromagnetic layer is that of improved SNR. The middle sublayer can be as thin as 0.7 nm and still provide improved SNR.

At step 560 of method 500, an upper CoPtCrB-alloy sublayer of the upper ferromagnetic layer (e.g., upper sublayer 310 of FIG. 3) is deposited on the middle CoCrB layer, according to an embodiment of the present invention. The upper sublayer is comprised of a CoPtCrB-based alloy material, e.g., $Co_{60}Pt_{13}Cr_{12}Bl_{15}$ and has a higher magnetic moment than the magnetic moment of the lower sublayer. The upper sublayer may have a protective overcoat (e.g., overcoat 375 of FIG. 3) to protect it from oxidation and mechanical wear. Such an overcoat may be comprised of a carbon or silicon nitride material.

FIG. 6 is a series of graphs showing measured improvement in SNR with the addition of cobalt-chromium-boron alloy sublayer 320 in the middle of upper recording layer 305, in accordance with an embodiment of the present invention. Graph 610 shows the SNR in decibels (db) as a function of density in kilo-flux change per inch (kfci) for an antiferromagnetic recording media having a two-sublayer upper recording layer with no middle layer 320 of CoCrB. Graph 620 shows the SNR as a function of density for a middle sublayer 320 of CoCrB that has a thickness of 0.7 nm. Graph 630 shows the SNR as a function of density for a middle sublayer 320 of CoCrB that has a thickness of 1.7 nm. It can be seen that the addition of middle sublayer 320 provides a decided improvement in SNR, even for a thickness of only 0.7 nm. Additional thickness of middle sublayer 320 up to approximately 3 nm continues to furnish improvement in the SNR.

FIG. 7 is a graph 700 illustrating measured improvement 710 in log of the bit error rate (log BER) for various thicknesses of a CoCrB alloy sublayer in the middle of an upper recording layer 305, in accordance with an embodiment of the present invention. The BER is the number of errors per million bits. It can be seen that a substantial improvement occurs in the log BER between a CoCrB thickness of 0.0 nm (no middle sublayer 320) and one of 0.7 nm. Further improvement is seen in the log BER for a thickness of 1.0 nm. The small increase in the log BER between 1.0 nm and 1.3 nm is within the error dead-band, and the log BER is seen to improve further for a thickness of 1.7 nm.

Thus, the present invention provides, in various embodiments, a method and apparatus for improving signal-to-noise ratio in longitudinal recording media. The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A first recording layer of a longitudinal recording media residing at the top of a recording media structure comprising:
    an upper sublayer comprised of a CoPtCrB-based alloy material;
    a lower sublayer comprised of a CoPtCrB-based alloy material;
    a middle sublayer comprised of a CoCrB-alloy, said middle sublayer coupled to said upper sublayer and to said lower sublayer and thinner than said upper sublayer and said lower sublayer; and
    a second recording layer coupled to said first recording layer by a coupling layer, said second recording layer having an opposite magnetization direction to the magnetization direction of said first recording layer, an underlayer deposited prior to said second layer, wherein said second layer is adjacent to said underlayer and wherein said underlayer comprises a CrMoB-based alloy.

2. The first recording layer as described in claim 1 wherein said upper sublayer has a higher magnetic moment than a magnetic moment of said lower sublayer.

3. The first recording layer as described in claim 1, wherein said middle sublayer does not require a Pt component.

4. The first recording layer as described in claim 1, wherein said coupling layer comprises ruthenium.

5. The first recording layer as described in claim 1, wherein said coupling layer comprises rhodium.

6. The first recording layer as described in claim 1, wherein said second recording layer comprises a CoCrTa-based alloy.

7. The first recording layer as described in claim 1, wherein said upper sublayer has a protective overcoat.

* * * * *